US012384064B2

(12) United States Patent
Stobar et al.

(10) Patent No.: US 12,384,064 B2
(45) Date of Patent: Aug. 12, 2025

(54) BOX BREAKDOWN TOOL

(71) Applicants: Ahyoung Stobar, Lake Tapps, WA (US); James Stobar, Lake Tapps, WA (US)

(72) Inventors: Ahyoung Stobar, Lake Tapps, WA (US); James Stobar, Lake Tapps, WA (US)

( * ) Notice: Subject to any disclaimer, the term of this patent is extended or adjusted under 35 U.S.C. 154(b) by 0 days.

(21) Appl. No.: 18/350,659

(22) Filed: Jul. 11, 2023

(65) Prior Publication Data

US 2025/0018588 A1 Jan. 16, 2025

(51) Int. Cl.
*B26B 27/00* (2006.01)

(52) U.S. Cl.
CPC .................................. *B26B 27/005* (2013.01)

(58) Field of Classification Search
CPC ........ B26B 27/005; B26B 27/00; A61Q 13/00
See application file for complete search history.

(56) References Cited

U.S. PATENT DOCUMENTS 1,157,489 A * 10/1915 Yorke ..................... B26B 13/22 30/146
7,730,620 B1 * 6/2010 Anastasi ............... B26B 27/005 30/294
D714,124 S * 9/2014 Fujino .............................. D8/98
D718,498 S * 11/2014 Gu ................................ D28/55
9,737,999 B2 * 8/2017 Kommer ................... B26B 1/02
9,914,227 B2 * 3/2018 Greadington ....... B65B 69/0008
2007/0245569 A1 * 10/2007 Yu Chen ................... B26B 3/00 30/162
2008/0178474 A1 * 7/2008 Spencer .................... B26B 9/00 30/294
2009/0188052 A1 7/2009 Wright et al.
2011/0219630 A1 * 9/2011 Johanson .............. B26B 27/005 30/289
2012/0285021 A1 * 11/2012 Park ........................ B26B 27/00 30/29.5
2015/0107119 A1 * 4/2015 Yu Chen ............... B26B 27/005 30/283
2016/0318199 A1 * 11/2016 Madaisky ............. B26B 27/005
2017/0066118 A1 3/2017 Berman
2020/0131015 A1 * 4/2020 Votolato .................... B67B 7/30
(Continued)

FOREIGN PATENT DOCUMENTS

WO 2019026946 A1 2/2019
WO 2022036439 A1 2/2022

OTHER PUBLICATIONS

PCT/US2024/037662, "Notification of Transmittal of the International Search Report and the Written Opinion of the International Searching Authority, or the Declaration", International Searching Authority, Oct. 17, 2024, pp. 1-15.

*Primary Examiner* — Omar Flores Sanchez
(74) *Attorney, Agent, or Firm* — Kunzler Bean & Adamson; Daniel Hopkinson

(57) ABSTRACT

Disclosed is a hand tool for opening and breaking down containers. In certain examples, the hand tool includes an elongated handle having an end and defining a longitudinal axis. The hand tool also includes a first arm coupled to the handle and extending away from the end along the longitudinal axis. The hand tool also includes a second arm coupled to the handle and extending away from the end along the longitudinal axis, where the first arm and the second arm form a jaw.

20 Claims, 7 Drawing Sheets

(56) References Cited

U.S. PATENT DOCUMENTS

| | | | | |
|---|---|---|---|---|
| 2020/0215708 | A1* | 7/2020 | Nguyen | B26B 3/08 |
| 2020/0307861 | A1* | 10/2020 | Aviv | B65D 77/40 |
| 2021/0316467 | A1* | 10/2021 | Martin | B26B 27/005 |
| 2022/0024742 | A1* | 1/2022 | Skenduli | B26B 27/005 |
| 2023/0072943 | A1* | 3/2023 | Hausmann | B26B 5/005 |

* cited by examiner

BOX BREAKDOWN TOOL

FIELD

This application relates generally to tool for breaking down boxes. In particular, this application relates to a tool with safety features to prevent a user from accidental injuries.

BACKGROUND

Box cutters, also known as utility knives, have become essential tools in numerous industries due to their ability to efficiently open packages, cut through various materials, and perform other tasks. Traditional box cutters typically consist of a handle and a retractable razor blade. While these tools have proved indispensable in enhancing productivity, they also present significant risks to user safety and wellbeing.

Accidental injuries resulting from the use of box cutters are unfortunately all too common. The sharpness and retractable nature of the blade, combined with the ease of handling and operation, make them potentially hazardous if not used with utmost caution. Incidents involving box cutters can range from minor cuts and lacerations to more severe injuries, including deep wounds, tendon damage, and even accidental amputations.

Although safety improvements have been made over time, traditional box cutters and utility knives remain prone to accidental injuries due to several inherent limitations. Existing safety mechanisms, such as manually retractable blades or built-in blade guards, often require precise user manipulation and may be prone to human error or misuse. In some cases, the mechanisms themselves can fail or become unreliable with frequent use, compromising user safety.

Additionally, existing safety features typically focus on the operational use of box cutters, neglecting potential hazards during storage or when not in use. The lack of effective safety measures to prevent unauthorized access, accidental blade deployment, or unintended contact with the blade exacerbates the risks associated with box cutter usage.

SUMMARY

A hand tool for opening and breaking down containers is disclosed. In certain examples, the hand tool includes an elongated handle having an end and defining a longitudinal axis. The hand tool also includes a first arm coupled to the handle and extending away from the end along the longitudinal axis. The hand tool also includes a second arm coupled to the handle and extending away from the end along the longitudinal axis, where the first arm and the second arm form a jaw.

In certain examples, the first arm further comprises a pair of opposing side surfaces that converge to a pointed end. An angle formed by the pair of opposing side surfaces is in the range of between about 5 and 35 degrees.

In certain examples, the second arm comprises a squared end disposed between a pair of opposing side surfaces. The squared end and the pair of opposing side surfaces may be beveled and have serrated portions. In certain examples, an angle formed by the first end and the second end is in the range of between about 15 and 25 degrees.

A method of manufacturing the breakdown tool is also disclosed.

BRIEF DESCRIPTION OF THE DRAWINGS

In order that the advantages of the embodiments of the subject disclosure will be readily understood, a more particular description of the embodiments will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures Like numbers refer to like elements in all figures, including alternate embodiments of like elements.

Figure 1A:
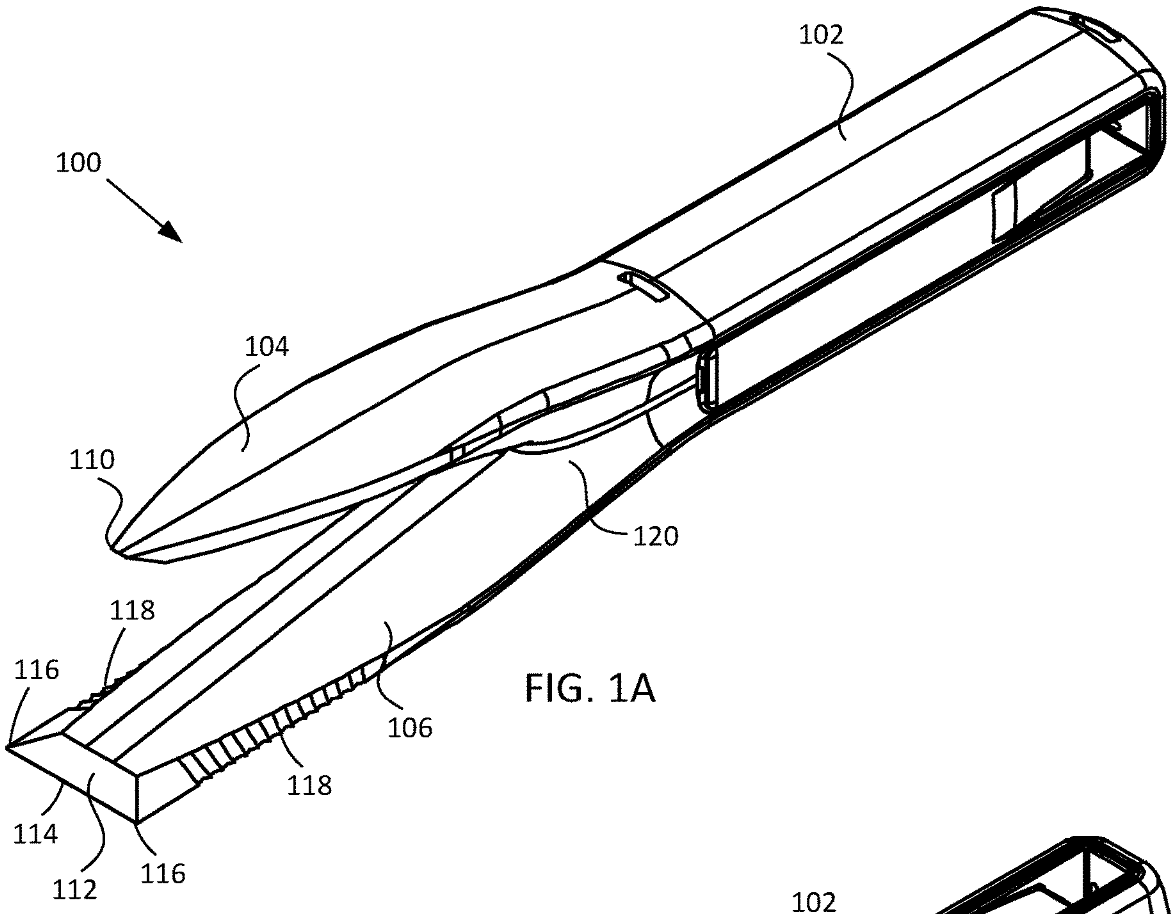
FIGS. 1A and 1B are perspective view diagrams of a breakdown tool, according to aspects of the disclosure.
Figure 1B:
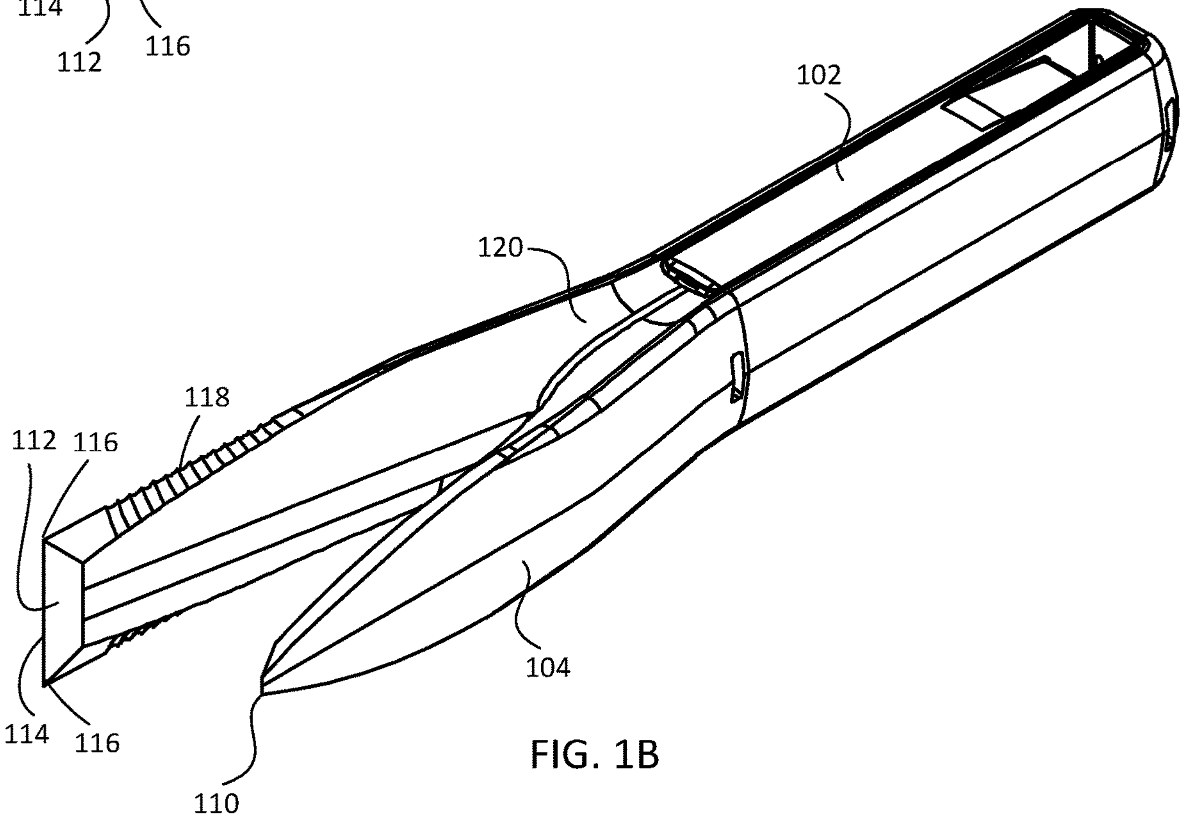

FIGS. 1A and 1B are perspective view diagrams of a breakdown tool 100, according to aspects of the disclosure. In other examples, the breakdown tool 100 is referred to as an opening tool. The breakdown tool 100 is useful for the safe opening of sealed containers, such as cardboard boxes that are closed with tape, plastic film/shrink wrap, and/or adhesive. The breakdown tool 100 is formed of, in certain examples, a rigid material including, but not limited to, rigid polymers, metals, and/or metallic alloys. In certain examples, the breakdown tool is formed of a single material, such as glass fiber reinforced plastic. The breakdown tool may also be formed of a plastic resin such as ABS, PP or Nylon, that may be reinforced with glass fibers in some examples. In other examples, the breakdown tool is formed of, but is not limited to, combinations of polymers and metals.

The breakdown tool 100, in certain examples, includes an elongated handle 102 that is configured for gripping by a hand of a user. The handle 102, in the depicted example, is formed with a generally rectangular cross-section (i.e., rounded rectangle). However, other cross-section geometries are contemplated. In other words, any suitable cross-section geometry that is usable for gripping may be implemented.

A pair of opening arms 104, 106 extend outward from the handle 102 in a generally longitudinal direction. Stated differently, the opening arms 104, 106 extend outward from the handle generally along a longitudinal axis that is formed by the handle, such as is depicted by the dotted line 108 (see FIG. 3B). The opening arms 104, 106 may be formed as a unitary body with the handle 102. In other examples, the handle 102 is releasably coupled to the opening arms 104, 106. The first opening arm 104 (hereinafter "first arm 104") is configured to form a substantially pointed end 110 that resembles a knife blade. The first arm 104 is useful for sliding into areas of a container that are well sealed, such as a flap of a cardboard box that is glued to another area of the cardboard box (see FIG. 6B).

The second opening arm 106 (hereinafter "second arm 106") is configured to form a substantially squared end 112. In other words, the squared end 112 is an end that includes a substantially linear edge 114 disposed between a pair of corners 116. The substantially linear edge 114 may be formed with a bevel, as depicted. In certain examples, the squared end 112 of the second arm 106 includes serrated portions 118 disposed along longitudinal sides (i.e., sides that extend longitudinally away from the handle) of the second arm 106.

The first arm 104 and the second arm 106 extend away from each other at an angle (see FIG. 3B) from a junction portion 120. The junction portion 120 is disposed between the opening arms 104, 106 and the handle 102. The junction portion 120 may be formed with curvilinear surfaces that help to wedge open flaps of containers (see FIGS. 6A and 6B).

Figure 2:
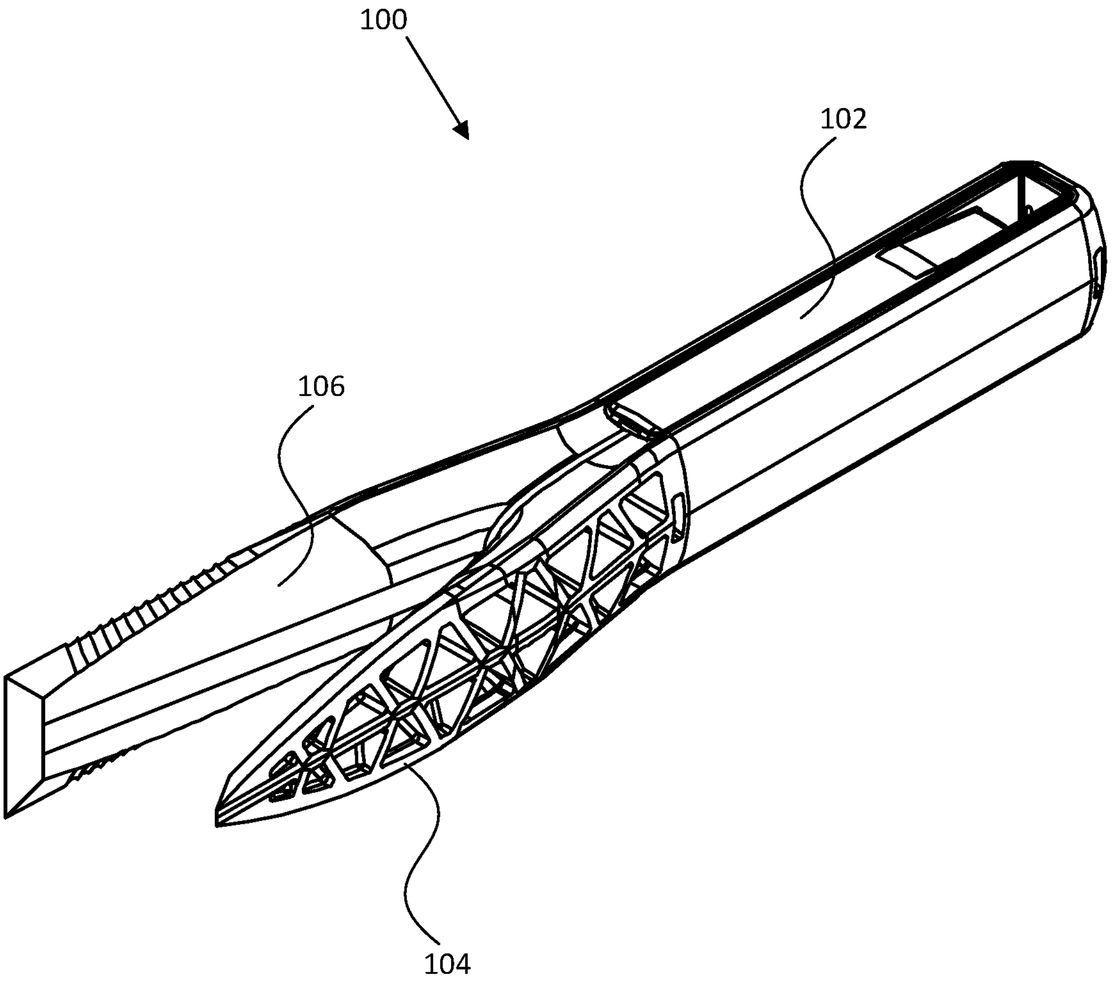
FIG. 2 is a perspective view diagram of the breakdown tool, according to examples of the disclosure.

FIG. 2 is a perspective view diagram of the breakdown tool 100, according to examples of the subject disclosure. In the depicted example, the breakdown tool 100 is formed with a honeycomb or ribbed surface on one or both of the first arm 104 and second arm 106 (not shown here). The ribbed surface has multiple advantages including, but not limited to, allow a consistent wall thickness. The ribs on both arms allow the prongs to be molded maintaining a consistent wall thickness through the tool.

Figure 3A:
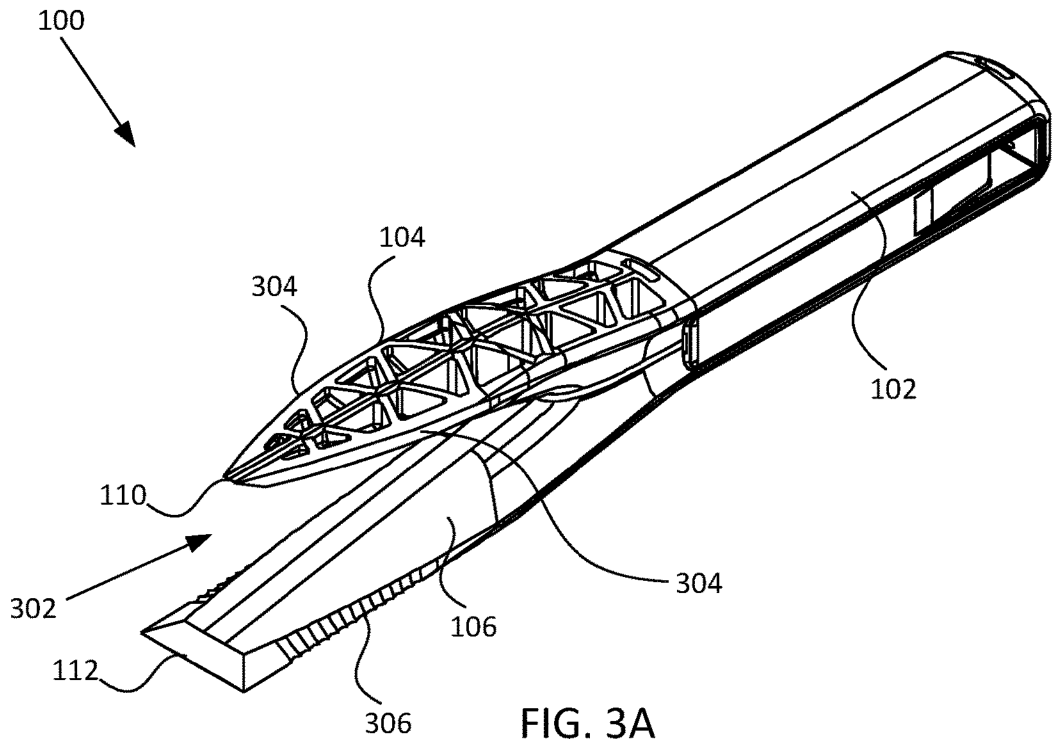
FIG. 3A is, a side perspective view diagram of the breakdown tool according to examples of the disclosure.
Figure 3B:
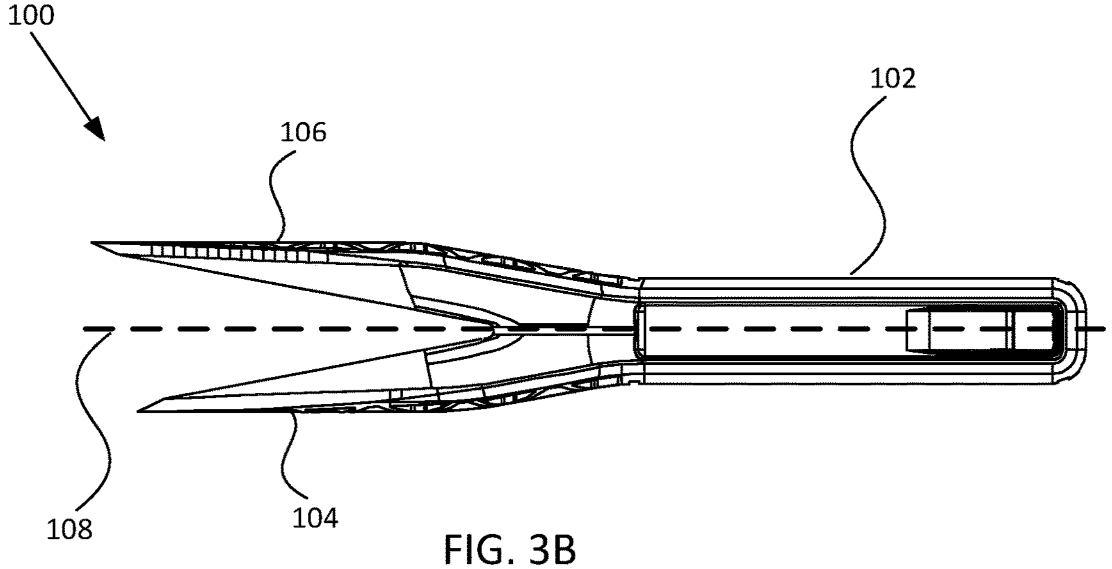
FIG. 3B is a side view diagram of the breakdown tool according to examples of the disclosure.

FIG. 3A, a side perspective view diagram, and FIG. 3B, a side view diagram, illustrate examples of the breakdown tool 100 according to examples of the disclosure. The depicted examples illustrate a "jaw" or opening formed between the first arm 104 and the second arm 106. The dashed line 108 depicts the longitudinal axis formed by the handle 102. The first arm 104 and the second arm 106 extend away from the handle 102 in a direction that is substantially parallel with the longitudinal axis 108.

The breakdown tool 100, in certain examples, has an elongated body with a length that is selected to optimize a leverage action that is useful in opening containers. The body may be one-piece, integral, and formed from a thermoplastic or fiber reinforced thermoplastic which is capable of transmitting a torque from a user to the container.

In certain examples, the first arm 104 is formed with opposing sides 304 that extend from the handle 102 and converge, or taper, to form a substantially pointed end 110. The second arm 106 is formed with opposing sides 306 that extend from the handle 102 to the squared end 112. The opposing sides 306 may, in a central region for example, diverge before converging towards the squared end 112. In certain examples, the squared end 112 is disposed transverse to the longitudinal axis 108, in in some examples is disposed orthogonally to the longitudinal axis.

The beveled surface 308 of the squared end 112 may, in certain examples, be directed upwards or towards the longitudinal axis 108 (i.e., towards the jaw 302 area). In other examples, the beveled surface 308 is facing away from the longitudinal axis 108. The beveled surface 308 of the squared end 112 may continue along the opposing sides 306 of the second arm 106 towards the handle 102. Serrated portions 118 disposed along the opposing sides 306 aid in cutting through tape or other fastening devices used to close a container. The serrated portions 118 may be formed in the rigid polymer that forms the breakdown tool 100. Alternatively, the serrated portions 118 may be, for example, metal inserts that are attached (or co-molded into) to the second arm 106.

Figure 4A:
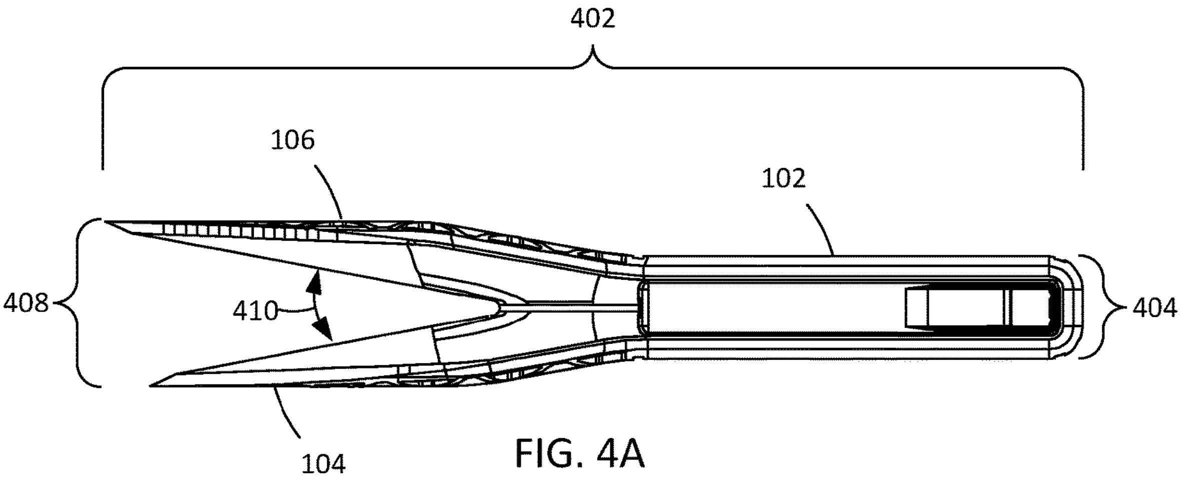
FIGS. 4A and 4B are side and top view diagrams, respectively, of the breakdown tool, according to examples of the disclosure.
Figure 4B:
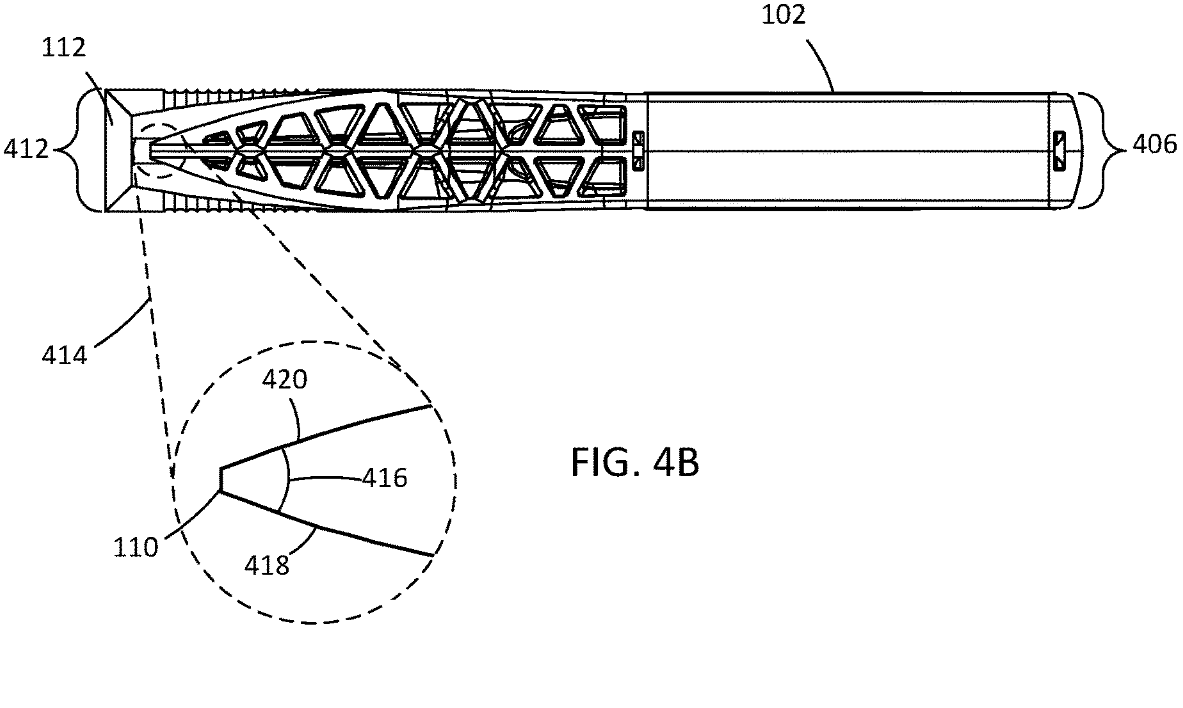

FIGS. 4A and 4B are side and top view diagrams, respectively, of the breakdown tool 100, according to examples of the disclosure. In certain examples, the breakdown tool 100 is formed having a length 402 in the range of between about 200 and 330 mm. In other examples, the length 402 is in the range of between about 240 and 290 mm. The length 402 is selected to maximize comfort, usability, and leverage when being used by an adult. A height 404 and width 406 of the handle 102 is in the range of between about 20 and 40 mm. In certain examples, the height 404 and width 406 are substantially equivalent. In alternative examples, the width 406 is greater than the height 404, or vice versa.

A height 408 of the jaw opening is selected to best allow for usability of either the first arm 104 or the second arm 106. Stated differently, the height 408 is selected to allow the user to effectively use one of the arms 104,106 without impeding the usability of the selected arm. For example, if the jaw opening was too narrow, a user may find it difficult to slide the first arm 104 in-between surfaces of a container. In certain examples, the height 408 of the jaw opening is in the range of between about 30 and 60 mm. In other examples, the height 408 of the jaw opening is in the range of between about 40 and 50 mm.

An angle 410 formed by the first arm 104 and the second arm 106 corresponds with the height 408, and is selected for the same reasons. In other words, the angle 410 is selected to allow the effective use of either arm, maximize leverage of the tool when used to pry, and maximize comfort in the hand of a user. In certain examples, the angle 410 is in the range of between about 15 and 25 degrees. In other examples, the angle 410 is in the range of between about 19 and 23 degrees.

A width 412 of the squared end 112 is in the range of between about 23 and 43 mm. In other examples, the width 412 of the squared end 112 is in the range of between about 30 and 36 mm. The width is selected to maximize comfort and usability. A wide handle grip helps with comfort by spreading out the force load on the hand. The more surface area that the handle can contact the hand the more comfortable it will be when applying a force.

Callout 414 depicts an enlargement of the pointed end 110. As used herein, the term "pointed" signifies that an angle 416 between side surfaces 418, 420 is less than 90 degrees. In certain examples, the angle 416 is in the range of between about 5 and 35 degrees. Although the depicted examples of the disclosure describe an arm with a pointed end 110 and an arm with a squared end 112, it is contemplated that both arms may include a squared end 112, or in the alternative, a pointed end 110.

Figure 5:
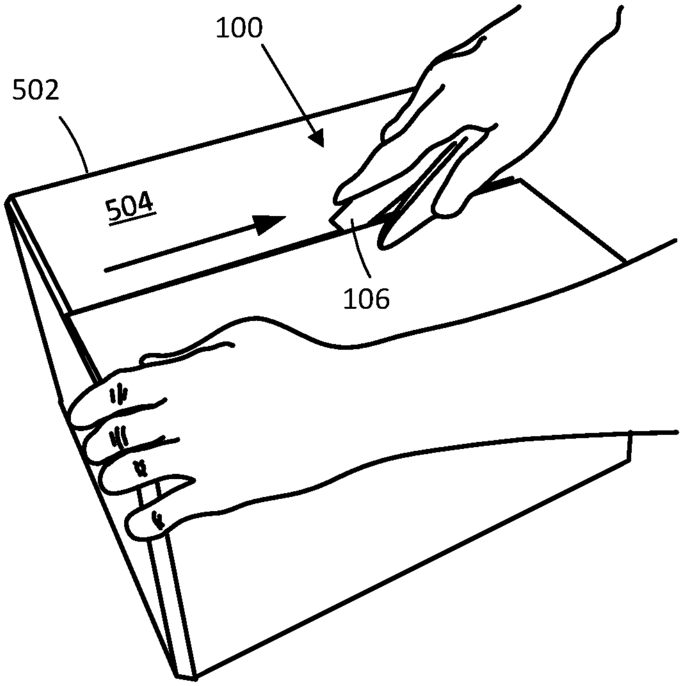
FIG. 5 is a perspective view diagram of the breakdown tool in use, according to examples of the disclosure.

FIG. 5 is a perspective view diagram of the breakdown tool 100 in use, according to examples of the disclosure. The breakdown tool 100, when held by a user, may be used to slice through tape that has sealed a container, such as the depicted cardboard box 502. The second arm 106, with the squared end 112 is useful to drag through the tape to unseal the cardboard box. The serrated portions (not shown here) may also help in cutting through the tape. The squared end 112 may be used to slide between flaps 504 of the cardboard box 502. The breakdown tool 100 beneficially allows a user to quickly and safely unseal and breakdown/flatten cardboard boxes without the use of metal knife edges.

Figure 6A:
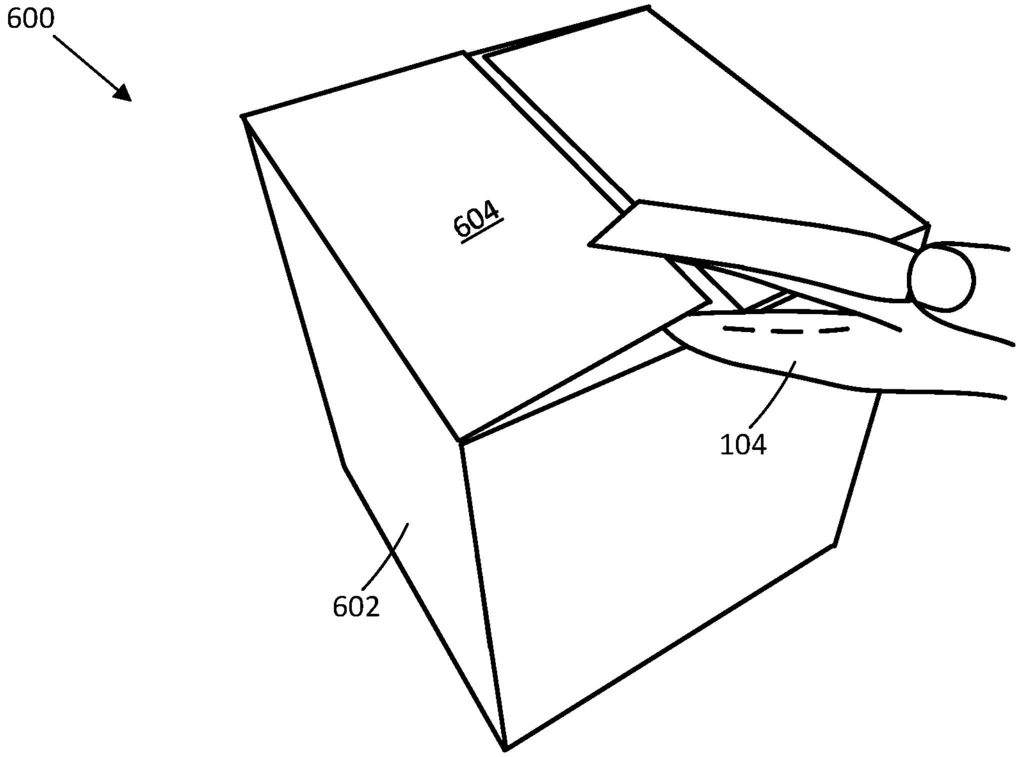
FIGS. 6A and 6B are perspective view diagrams of the first arm prying open a box, in accordance with examples of the disclosure.
Figure 6B:
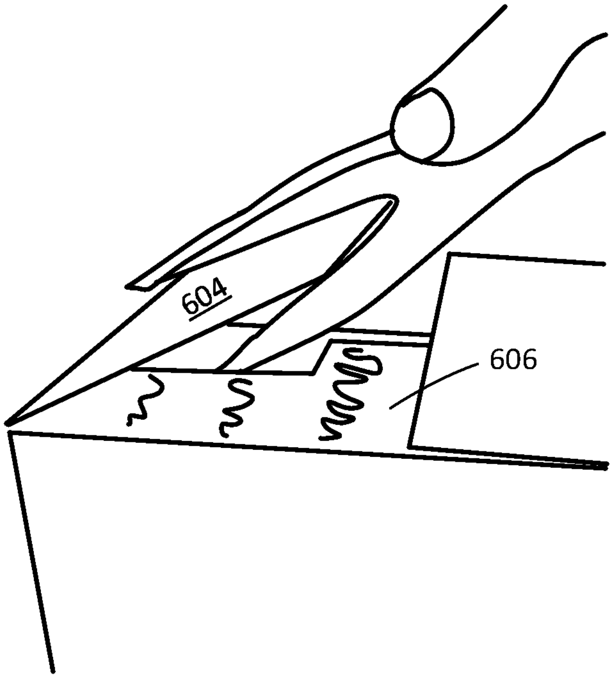

FIGS. 6A and 6B are perspective view diagrams of the first arm 104 prying open a box, in accordance with examples of the disclosure. Some cardboard boxes 602 are sealed with adhesive instead of tape. In such a situation, the first arm 104 is useful for prying open an adhered flap 604. As depicted in FIG. 6A, the pointed end of the first arm 104 is inserted between flaps 604 and is useful to wedge apart the top flap 604 from the flap 606 underneath. In certain situations, just inserting one of the jaws between glued flaps can break the adhesive bond.

A user may lift, or pry open, as depicted in FIG. 6B, the top flap 604 by breaking the adhesive bond between flaps 604, 606. As described above, the contour of the surfaces of the first arm 104 is selected to minimize the force required to insert the first arm 104 between the flaps 604, 606, while the length of the first arm maximizes leverage and comfort for the user.

Figure 7:
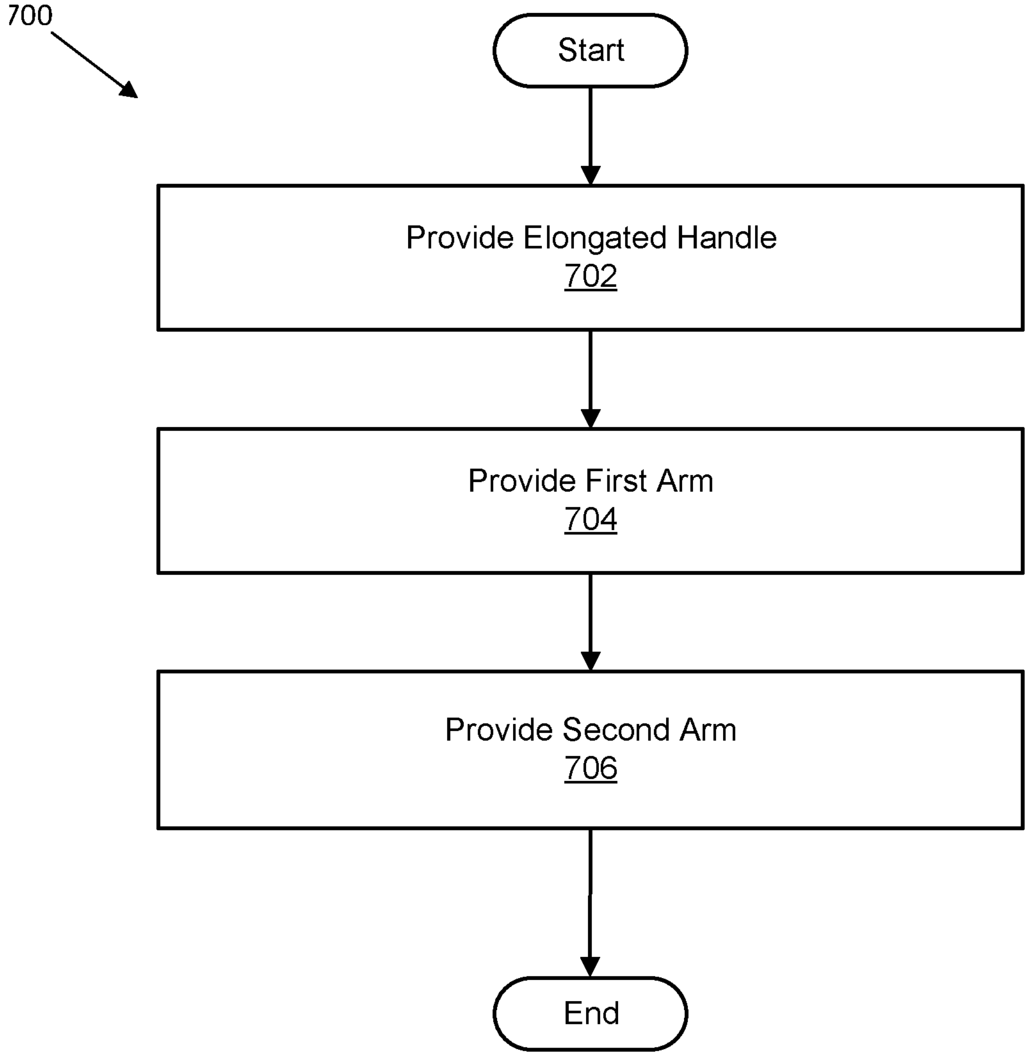
FIG. 7 is a schematic flow chart diagram of a method of manufacturing a breakdown tool, according to examples of the disclosure.

FIG. 7 is a schematic flow chart diagram of a method of manufacturing a breakdown tool, according to examples of the disclosure. In certain examples, the method 700 starts and at step 702 an elongated handle is provided. The elongated handle may be provided in the manner described above with reference to FIGS. 1A-6B. At step 704 the first arm is provided in the manner described above with reference to FIGS. 1A-6B. At step 706, the second arm is proved in the manner described above with reference to FIGS. 1A-6B. The breakdown tool may be provided as a single, unitary piece formed by injection molding, or any suitable manufacturing process. In other examples, the breakdown tool is formed of separate pieces that are coupled or fastened together.

This description uses examples to describe embodiments of the disclosure and also to enable any person skilled in the art to practice the embodiments, including making and using any devices or systems and performing any incorporated methods. The patentable scope of the disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hand tool for opening and breaking down containers, the hand tool comprising:
- an elongated handle having an end and defining a longitudinal axis;
- a first arm coupled to the elongated handle and extending away from the end along the longitudinal axis; and
- a second arm coupled to the elongated handle and extending away from the end along the longitudinal axis, where the first arm and the second arm form a jaw, and where the second arm comprises a cutting surface extending away from the first arm.

2. The hand tool of claim 1, where the first arm further comprises a pair of opposing side surfaces that converge to an end.

3. The hand tool of claim 2, where the end of the first arm comprises a pointed end.

4. The hand tool of claim 2, where an angle formed by the pair of opposing side surfaces is in a range of between about 5 and 35 degrees.

5. The hand tool of claim 1, where the second arm comprises a squared end disposed between a pair of opposing side surfaces.

6. The hand tool of claim 5, where the squared end and the pair of opposing side surfaces are beveled to form the cutting surface.

7. The hand tool of claim 5, where at least one of the pair of opposing side surfaces comprises a serrated portion.

8. The hand tool of claim 5, where each of the pair of opposing side surfaces comprises a serrated portion.

9. The hand tool of claim 1, where an angle formed by the first end and the second end is in a range of between about 15 and 25 degrees.

10. A hand tool comprising:
- an elongated handle having an end and defining a longitudinal axis;
- a first arm coupled to the elongated handle and extending away from the end along the longitudinal axis, where the first arm comprises a first pair of opposing side surfaces that converge to a pointed end;
- a second arm coupled to the elongated handle and extending away from the end along the longitudinal axis, where the second arm comprises a squared end disposed between a second pair of opposing side surfaces, and where each of the second pair of opposing side surfaces includes a serrated portion; and
- where the first arm and the second arm form a jaw.

11. The hand tool of claim 10, where an angle formed by the first pair of opposing side surfaces is in a range of between about 5 and 35 degrees.

12. The hand tool of claim 10, where the squared end and the pair of opposing side surfaces are beveled.

13. The hand tool of claim 10, where an angle formed by the first end and the second end is in a range of between about 15 and 25 degrees.

14. A method of manufacturing a hand tool for breaking down a container, the method comprising:

providing an elongated handle having an end and defining a longitudinal axis;

providing a first arm coupled to the elongated handle and extending away from the end along the longitudinal axis; and providing a second arm coupled to the elongated handle and extending away from the end along the longitudinal axis, where the first arm and the second arm form a jaw, and where the second arm comprises a cutting surface extending away from the first arm.

15. The method of claim 14, where the first arm further comprises a pair of opposing side surfaces that converge to an end.

16. The method of claim 15, where the end of the first arm comprises a pointed end.

17. The method of claim 15, where an angle formed by the pair of opposing side surfaces is in a range of between about 5 and 35 degrees.

18. The method of claim 14, where the second arm comprises a squared end disposed between a pair of opposing side surfaces.

19. The method of claim 18, where the squared end and the pair of opposing side surfaces are beveled to form the cutting surface.

20. The method of claim 19, where at least one of the pair of opposing side surfaces comprises a serrated portion.

* * * * *